Patented June 28, 1949

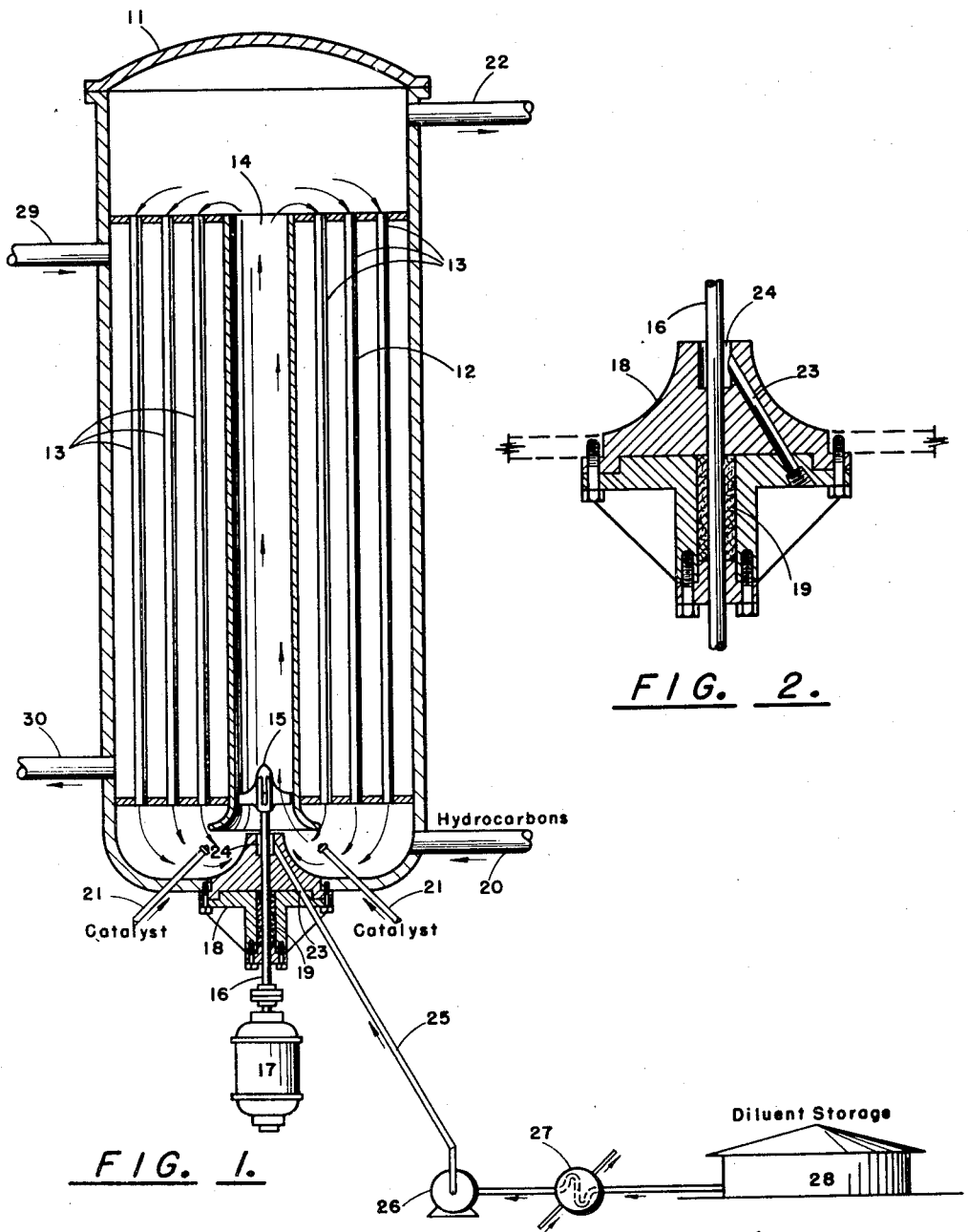

2,474,592

UNITED STATES PATENT OFFICE 2,474,592

POLYMERIZATION OF ISOBUTYLENE WITH A DIOLEFIN

Frederick A. Palmer, Wooster, Tex., assignor to Standard Oil Development Company, a corporation of Delaware Application May 5, 1944, Serial No. 534,366

3 Claims. (Cl. 260—85.3)

The present invention is directed to an improvement in a method and apparatus for conducting polymerizations or condensations in which liquid materials are converted into plastic and/or elastic solids or semi-solids. More particularly, the invention relates to the production of synthetic rubber from low boiling hydrocarbons.

In order to illustrate the nature of the present invention, reference will be made in the following discussion to the particular process in which isobutylene is copolymerized with a diolefin in the presence of a metal halide catalyst. In practice, this process is carried out in a reactor in which a reaction mass is circulated and into which reactants and catalyst are injected. In order to keep the liquid in circulation an agitator is provided in the vessel.

Prior to the present invention it has been general practice to conduct the polymerization of tertiary olefins and diolefins in the presence of diluent liquid; specifically an alkyl halide such as methyl halide has been found particularly suitable. The reaction is catalyzed by the action of a catalyst material such as an aluminum halide dissolved in a suitable solvent, and it is customary to employ temperatures of the order of —120 to about —175° F. to form polymers of the proper molecular weight having rubbery characteristics. Good operation is obtained at temperatures between —130 and —145° F.

Since considerable heat of reaction is liberated in the polymerization of tertiary olefins and diolefins in the aforementioned type of reaction, it is necessary to refrigerate the reaction material to maintain the low temperatures required. One method of providing refrigeration is to employ internal refrigeration with a suitable refrigerant included with the material charged to the reactor.

Difficulty has been encountered in the commercial practice of this method by reason of the fact that a deposit of doughy or rubbery product collects on the shaft of the agitator projecting into the reaction mixture and increases in size with time until it becomes necessary to shut down the unit. It is postulated that as the shaft of the agitator rotates the liquid reaction mixture for a certain distance from the shaft will rotate with it thereby creating a zone in the reaction mixture where there is no turbulence. The reactants in this zone react to form a rubberlike product which then rotates with the shaft. This, in turn, causes another layer of reaction liquid adjacent the rubber-like mass to rotate with the shaft and another layer of reaction product is formed; and thus, until a large ball of the reaction product is formed on the shaft and the agitator.

According to the present invention, this difficulty is overcome by creating turbulence in the reaction mixture adjacent the shaft of the agitator. This may be done in many ways but is most conveniently done by taking advantage of the fact that a diluent must, in any case, be introduced into the reactor. Therefore, according to the preferred embodiment of the present invention, all or part of the diluent is fed into the reactor along the shaft of the agitator to thereby preclude the possibility of the reaction mixture adjacent the shaft rotating with it. In usual practice, it may not be necessary to introduce more than 50% of the diluent material injected into the reactor at this point. On the other hand, as little as 2% may be satisfactory. In commercial operations, from 5 to 10% of diluent based on the feed hydrocarbons usually will suffice to eliminate the aforesaid difficulty.

The invention may be better understood by reference to the following detailed description of the accompanying drawing in which Figure 1 is a front elevation in partial section of a preferred embodiment in accordance with the present invention, and Figure 2 is a section of the apparatus for introducing the diluent in accordance with the present invention.

Turning now to the drawing and to Figure 1 in particular, numeral 11 designates a polymerization reactor of the tubular type. Polymerization reactor 11 is provided with a tube bundle 12 with tubes 13 extending vertically therethrough. Tube bundle 12 encloses a cylindrical space 14 at the bottom of which is located a mixing device or impeller 15 which is actuated through shaft 16 by prime mover 17. Leakage of the contents of reactor 11 is prevented by provision of a stuffing box 18 with suitable packing gland and packing material 19.

Reactor 11 is provided with an inlet tube 20 by way of which reactant hydrocarbons are introduced and catalyst injection tubes 21 in which a catalytic solution is introduced into the reactor. An outlet 22 located in the uppermost portion of the reactor vessel 11 allows drawoff of polymer products as a suspension in the unreacted hydrocarbons and diluent.

Stuffing box 18 is provided with a channel 23 which terminates in a chamber 24 which in turn is in communication with the interior of the reactor vessel 11. Channel 23 is connected by way of line 25, pump 26 and chiller 27 to diluent storage vessel 28.

In Figure 2 corresponding parts have been designated with the same numerals employed in describing the embodiment of Figure 1 and further description is not needed.

When operating in accordance with the method and apparatus of the present invention, as applied to the copolymerization of tertiary olefins and diolefins, a mixture of tertiary monoolefin and diolefin is introduced into the vessel 11 in a refrigerated condition at a temperature in the neighborhood of −140° F. or lower. The feed mixture introduced by way of line 20 may contain a diluent and/or a suitable refrigerant. A catalyst solution such as, for example, aluminum chloride dissolved in methyl chloride is also introduced into vessel 11 through catalyst injection nozzles 21. Of course it is understood that the mixing device 15 connected to prime mover 17 by shaft 16 is started and the reacted materials are circulated through the vessel 11. Pump 26 withdraws diluent, which is in a refrigerated condition by passage through chiller 27, from diluent storage tank 28 and introduces it into the reactor 11 through channel 23 and into chamber 24 and thence into the main body of the reactor, thereby effectively eliminating "doughnut" formation around the shaft 16.

Prior to operating in accordance with the present invention, it was observed that formation of large doughnuts of sticky rubbery polymer was experienced on shaft 16 immediately under the mixing device 15 and ultimately caused overloading of prime mover 17 and shutdown of the mixing device 15. By injecting a suitable diluent fluid in accordance with the present invention into the chamber 24 and thence into the reactor vessel 11, it was possible to eliminate completely the formation of objectionable sticky polymer bodies. The reason for the unexpected benefits of the present invention is not completely understood. In addition to the explanation already offered, it may be that by injecting a diluent into this particular portion of the reactor and around the impeller shaft 16 it is possible to provide a diluted condition in which the catalyst does not cause formation of the objectionable polymer bodies, but allows the rubbery material to remain suspended in the unreacted hydrocarbons and diluent in a manner in which they are easily handled. Another possible explanation of the beneficial results of employing the improved apparatus and method of the present invention is that injection of a refrigerated diluent around the shaft 16 removes heat caused by friction of the shaft rotating through the stuffing box 16, which heat is transmitted to that portion of shaft 16 in reactor vessel 11 which in turn heats up the reactants immediately surrounding it and causes formations of the sticky polymer on the shaft itself. It is to be clearly understood, of course, that these explanations of the beneficial results of the present invention are given for a clearer understanding and are not to be construed as limiting the invention in any manner whatever.

The refrigerated diluent injected into the reactor in accordance with the present invention may be an alkyl halide, carbon disulfide, or any other suitable liquid which will not freeze at the low temperatures employed in the reaction and which do not interfere with the reaction.

It is also to be understood that particular reference has been had to the copolymerization of tertiary olefins and diolefins merely for the purpose of illustration. The technique herein described is applicable to any reaction of this general type in which liquid reactants are employed and a plastic or rubbery solid or semi-solid is produced.

The nature and objects of the present invention having been fully described and illustrated, what I wish to claim as new and useful and to secure by Letters Patent is:

1. A method in accordance with claim 3 in which the refrigerated diluent is an alkyl halide.

2. A method in accordance with claim 3 in which the refrigerated diluent is injected into the reaction zone under temperature conditions at which the polymer is formed.

3. In a method for polymerizing liquefied isobutylene with a liquefied diolefin under conditions to form a rubber-like polymer in a reaction zone in which the isobutylene and diolefin are agitated by mechanical means carried on a rotating shaft immersed in said liquids, the improvement which comprises flowing a stream of refrigerated liquid diluent into said reaction zone longitudinally along that portion of said shaft which is immersed in said liquids.

FREDERICK A. PALMER.

REFERENCES CITED

The following references are of record in the file of this patent:

UNITED STATES PATENTS

| Number | Name | Date |
|---|---|---|
| 2,139,038 | Russell | Dec. 6, 1938 |
| 2,276,893 | Thomas et al. | Mar. 17, 1942 |
| 2,300,069 | Skoogland | Oct. 27, 1942 |
| 2,317,878 | Bannon | Apr. 27, 1943 |
| 2,322,073 | Thomas et al. | June 15, 1943 |
| 2,347,195 | Huff | Apr. 25, 1944 |